United States Patent [19]
Reed

[11] Patent Number: 5,813,438
[45] Date of Patent: Sep. 29, 1998

[54] BRAIDED CONDUIT AND METHOD OF MAKING A BRAIDED CONDUIT

[75] Inventor: Edward A. Reed, Waco, Tex.

[73] Assignee: Packless Metal Hose, Inc., Waco, Tex.

[21] Appl. No.: 236,217

[22] Filed: Apr. 28, 1994

[51] Int. Cl.⁶ .................................................. F16L 33/26
[52] U.S. Cl. .......................... 138/121; 138/109; 138/118; 138/127; 285/227; 285/903
[58] Field of Search .................................. 138/109, 121, 138/120, 118, 123, 127; 285/226, 227, 299, 903; 72/367, 369

[56] References Cited

U.S. PATENT DOCUMENTS

| | | |
|---|---|---|
| 770,599 | 9/1904 | Monteagle . |
| 2,337,490 | 12/1943 | Penner . |
| 2,365,688 | 12/1944 | Dewey . |
| 2,667,650 | 2/1954 | Friedman . |
| 2,722,437 | 11/1955 | Phillips . |
| 2,733,503 | 2/1956 | Beringer et al. . |
| 3,004,330 | 10/1961 | Wilkins . |
| 3,292,414 | 12/1966 | Goeke . |
| 3,468,371 | 9/1969 | Menze . |
| 3,863,526 | 2/1975 | Sygnator ............................... 76/107.1 |
| 4,031,745 | 6/1977 | McCarty ................................... 72/367 |
| 4,377,083 | 3/1983 | Shepherd .................................. 72/68 |
| 4,514,997 | 5/1985 | Zifferer ...................................... 72/68 |
| 4,523,637 | 6/1985 | Abramo ............................ 165/104.34 |
| 4,672,834 | 6/1987 | Alberto ..................................... 72/325 |
| 4,693,323 | 9/1987 | Owensby .............................. 174/35 C |
| 4,993,483 | 2/1991 | Harris ...................................... 165/45 |

FOREIGN PATENT DOCUMENTS

| | | |
|---|---|---|
| 731354 | 4/1966 | Canada . |
| 144460 | 6/1985 | European Pat. Off. . |
| 160498 | 11/1985 | European Pat. Off. . |
| 0202481 | 11/1986 | European Pat. Off. . |
| 0332853 | 9/1989 | European Pat. Off. . |
| 203759 | of 1900 | Germany . |
| 1 158 778 | 12/1963 | Germany . |
| 1223636 | 8/1966 | Germany . |
| 38 08 383 A1 | 9/1989 | Germany . |
| 57-49795 | 3/1982 | Japan . |
| 15510 | 6/1914 | United Kingdom . |
| 95/30107 | 11/1995 | WIPO . |

OTHER PUBLICATIONS

Titeflex Industrial Products Group, "Titeflex Metal Hose and Fittings", Catalog 777A.
Article Entitled "It Keeps Growing and Growing . . . " by Jim Wilder, Undercar Digest, vol. 19 No. 8, Mar. 1995, pp. 12–15.
Two (2) photographs of Midas Muffler Flexible Connector Exhaust Pipe, together with Midas Muffler Receipt for such pipe dated Mar. 22, 1995.
Section Drawing of Midas Muffler Flexible Connector Exhaust Pipe.
International Search Report for International application No. PCT/US95/02600 dated Jul. 13, 1995.
English translation of EP Patent Application 0,332,853 (Sep. 20, 1989).
English translation of EP Patent Application 0/202/481 (Nov. 26, 1986).
Maxwell Laboratories, Inc., "Magneform —Metal Forming with Magnetic Force", Product Bulletin MLB–2044A.
Packless Industries, "Packless Vibration Absorbers", Bulletin VA–1 (Mar. 1989).
Flexonics Inc., "Flexible Metal Hose and Fittings", Engineering Guide No. 350.
Maxwell Laboratories, Inc., "Magneform 7000 Series", Bulletin 1202A (1978).
Maxwell Laboratories, Inc., "Maxwell", Bulletin 1201R (1976).

*Primary Examiner*—Patrick E. Brinson
*Attorney, Agent, or Firm*—Conley, Rose & Tayon, P.C.

[57] ABSTRACT

Flexible convoluted conduit covered with braid made by cold forming the braid to an end of the conduit. Cold forming can involve magneforming. Resulting conduit is not brazed, welded, or annealed, thereby facilitating construction of convoluted conduits with higher working pressures and/or less braid material.

134 Claims, 12 Drawing Sheets

BRAIDED CONDUIT AND METHOD OF MAKING A BRAIDED CONDUIT

BACKGROUND OF THE INVENTION

1. Field of the Invention

This invention relates to braided conduit and methods of making braided conduits. In particular, this invention may be used in connection with flexible convoluted conduits.

2. Brief Description of the Related Art

Flexible conduits such as metal hoses or ducts have been used for a number of years. These conduits are particularly useful in applications whereby a need may arise for the conduit to be moveable. For instance, these applications may involve conduits used where significant vibration may occur (in which case the flexible conduit may be used as a vibration absorber), or in applications wherein the flexibility of the conduit is useful to move conduits and connections without fully disconnecting these conduits or connections. In some applications flexibility of the conduit is useful when it is desirable to install a conduit in a curved space (e.g., around another piece of equipment).

In one application flexible conduits may be used for the suction and discharge lines of air conditioning and refrigeration systems to dampen the transmission of compressor-induced vibration through system piping.

Flexible conduits may have cross-sections that may be circular, square, rectangular, oval, or other shapes, whether regular or irregular. These flexible conduits may include, for example, convoluted (i.e., grooved, interlocked, spiral or corrugated) copper, brass, bronze, steel, and stainless steel conduits. Other flexible conduit may be made of rubber or plastic materials that may or may not be convoluted.

One problem with flexible conduits is that pressure tolerances may reduce as flexibility is increased. For instance, in corrugated metal hoses, the flexibility is somewhat proportional to the number and size of the corrugations. However when appreciable internal pressure is applied to convoluted or corrugated metal hose, the hose will tend to elongate unless restrained. Generally this restraint is provided by a braid sheath or covering over the conduit. This braid may be made of, for example, copper, bronze, steel, stainless steel, or other alloys and materials. The braid may include a multitude of fibers or wires interlocked in various ways (such as criss-cross patterns, cross-hatch patterns, etc.) to increase their strength. An example of a flexible conduit covered with a braid is shown in FIG. 10. The flexible conduit in FIG. 10 includes reinforcing ferrules at each end, a wire braid woven in a criss-cross pattern, tube ends, and corrugated flexible tubing. The braid also provides protection to the conduit.

Typically braids are attached to flexible conduits by welding or brazing techniques (see braze joint in FIG. 10). In the embodiment shown in FIG. 10 the flexible tubing, tube end, braid, and ferrule are all brazed together at the braze joint. These techniques, however, tend to have the significant disadvantage that they cause certain portions of the material of the braid or the conduit, or both, to become annealed or weakened when relatively high temperatures are applied. As a result, the tensile strength of the braid materials may be significantly reduced, which in turn reduces the working pressures to which the conduit may be subjected. In these embodiments the braid tends to fail at or near the braze point.

SUMMARY OF THE INVENTION

In a general aspect an embodiment of the invention is directed to a method of covering a flexible convoluted conduit with a braid. The method includes (1) assembling the braid, the conduit, and a grip ring such that an outer surface of an end of the conduit is substantially surrounded by a portion of the braid, and wherein at least part of the portion of the braid is surrounded by a portion of the grip ring, and (2) cold forming the assembled braid, end, and grip ring such that a portion of the grip ring is compressed onto at least part of the portion of the braid, and such that at least part of the portion of the braid is held by friction between the an outer surface of the end and at least a portion of the grip ring.

Preferably the cold forming is by magneforming and preferably it thickens the grip ring as it compresses the grip ring. The flexible convoluted conduit may be prepared by (1) assembling a section of convoluted conduit by placing it onto a part of an end conduit with fill material placed between the section of convoluted conduit and the part of the end conduit, and (2) cold forming the assembled section of convoluted conduit, end conduit, and fill material such that the section of convoluted conduit is compressed onto a part of the end conduit and held by friction with the end conduit, the fill material being held by friction between the section of convoluted conduit and the end conduit.

The cold forming of the assembled section of convoluted conduit, end conduit, and fill material preferably bends the convoluted conduit onto the fill material to form a raised ridge in a portion of the convoluted conduit. The fill material may be heated to form a substantially airtight seal between the end conduit and the section of convoluted conduit, the heating being at temperatures low enough to prevent the convoluted conduit, braid (if present), etc. from annealing.

An embodiment of the invention is also directed to a conduit made by the methods described herein, and a conduit covered with a braid which includes (1) a section of flexible convoluted conduit comprising an end having an outer surface, (2) a braid covering the section of conduit and having a portion cold formed onto an outer surface of the end, wherein at least a portion of a grip ring is substantially surrounding at least part of the portion of the braid, the portion of grip ring being cold formed onto the braid such that the part of the portion of braid is held by friction between a portion of grip ring and an outer surface of the end.

Preferably the section of convoluted conduit is cold formed onto at least a portion of an end conduit such that the section of convoluted conduit is held onto a portion of the end conduit by friction with the end conduit, and a fill material being held by friction between the section of convoluted conduit and the end conduit.

Magneforming is preferably used to make the covered convoluted conduit. The convoluted conduit may preferably be bent onto the fill material to form a raised ridge, and the braid may be bent around the ridge. Preferably the braid is bent, thereby strengthening the frictional hold on the braid. More preferably, the conduit includes an outer diameter greater than an outer diameter of the end, the braid lies against both the outer diameter of the conduit and the outer diameter of the end, and the braid is bent so that it substantially conforms to the shape of an interface region between the conduit and the end.

In further embodiments, additional material may be cold formed onto at least a portion of the grip ring, the braid, and/or the conduit, thereby applying further compressive and frictional forces to hold these components in place.

The covered flexible conduit may be connected to pumps and compressors, and may act as a vibration absorber.

DETAILED DESCRIPTION OF THE PREFERRED EMBODIMENTS

Figure 1:
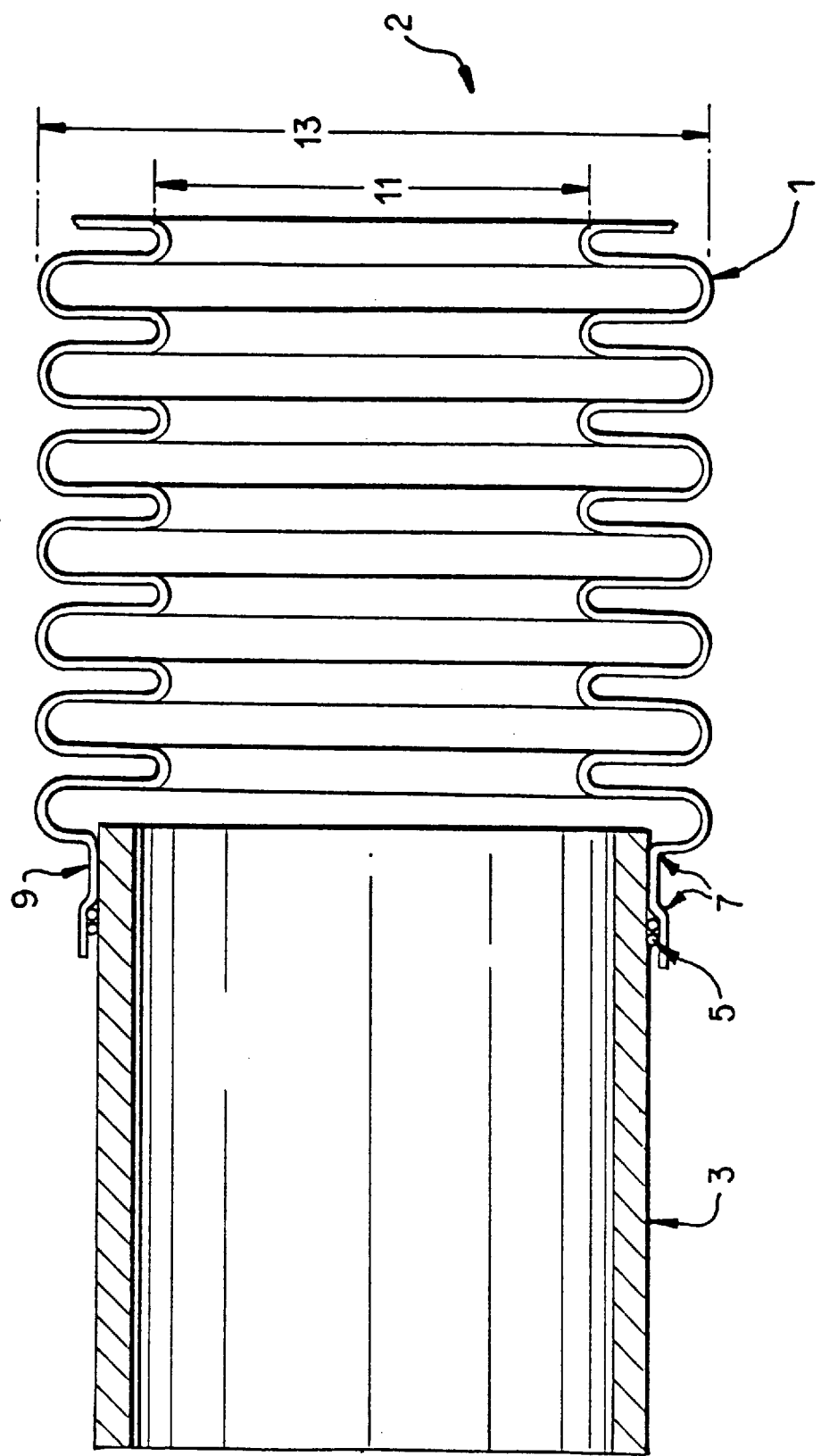
FIG. 1 depicts a section of convoluted conduit assembled with a conduit end and fill material (Scale 2:1).

FIG. 1 is a lengthwise cross-section of a section of convoluted conduit 1, an end conduit 3, and fill material 5. In FIG. 1, the section of convoluted conduit 1 is corrugated metal with outside diameter varying from outside diameter 11 to outside diameter 13. End conduit 3 may be a tube or fitting. Fill material 5 is preferably solder ring (i.e., solder wire) that has been wrapped around end conduit 3. In FIG. 1 the solder wire has been wrapped around end conduit 3 three times.

As shown in FIG. 1, in a preferred embodiment a section of convoluted conduit 1 may be placed onto a section of end conduit 3 with fill material 5 placed between the section of convoluted conduit 1 and the end conduit 3. The section of convoluted conduit 1 is preferably bent such that at least one bend 7 in this conduit 1 allows the portion 9 of the section of convoluted conduit 1 to be placed substantially adjacent to the end conduit 3 and the fill material 5.

Preferably the section of convoluted conduit 1 is cold formed. As such, in some embodiments bend 7 may be optional since the cold forming may serve to bend the section of convoluted conduit 1 to form portion 9, bend 7, and to bend the section of convoluted conduit 1 onto the fill material 5.

Figure 2:
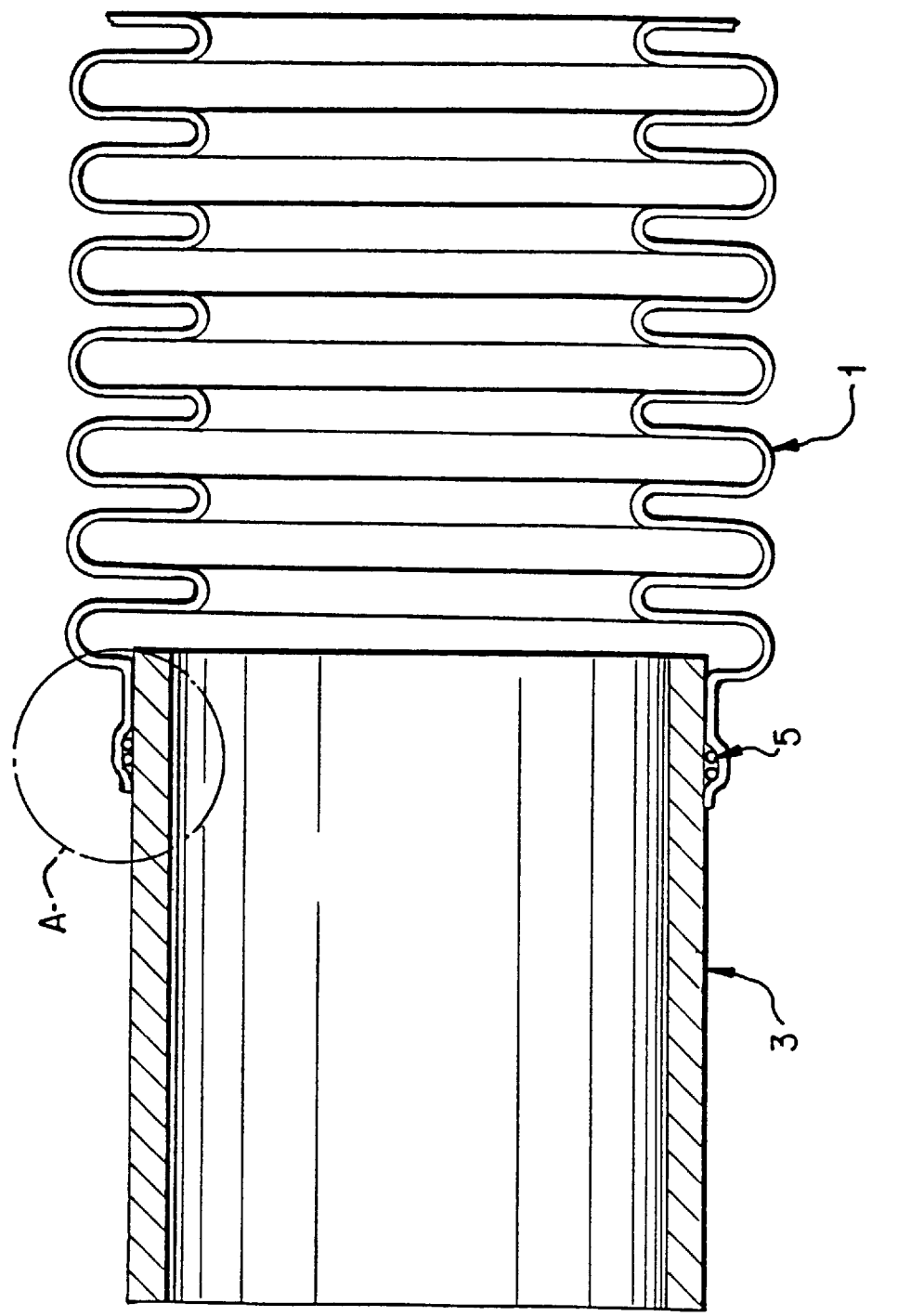
FIG. 2 depicts the assembly of FIG. 1 after it has been cold formed (Scale 2:1).

Once the assembly shown in FIG. 1 has been prepared, it may then be cold formed such that the section of convoluted conduit 1 is compressed onto a part of the end conduit 3 and held by friction with the end conduit 3. The fill material 5 is also preferably held by friction (e.g., trapped or encapsulated) between the section of conduit 1 and the end conduit 5. FIG. 2 shows the assembly in FIG. 1 after it has been cold formed.

In this application the term "cold forming" means bending materials without application of substantial additional heat. For instance, in a preferred embodiment the materials are made of metal which may be heated in order to bend it. In the context of this application, however, the metals are cold formed by magneforming, roll forming, hydraulic forming, tooling (e.g. by hand or by machine), or any other bending process which doesn't apply substantial additional heat to the materials to be bent. Of course, cold forming often results in heat as a byproduct of bending, etc., however such byproduct heat is not to be considered "substantial additional heat" for the purposes of this application.

Figure 3:
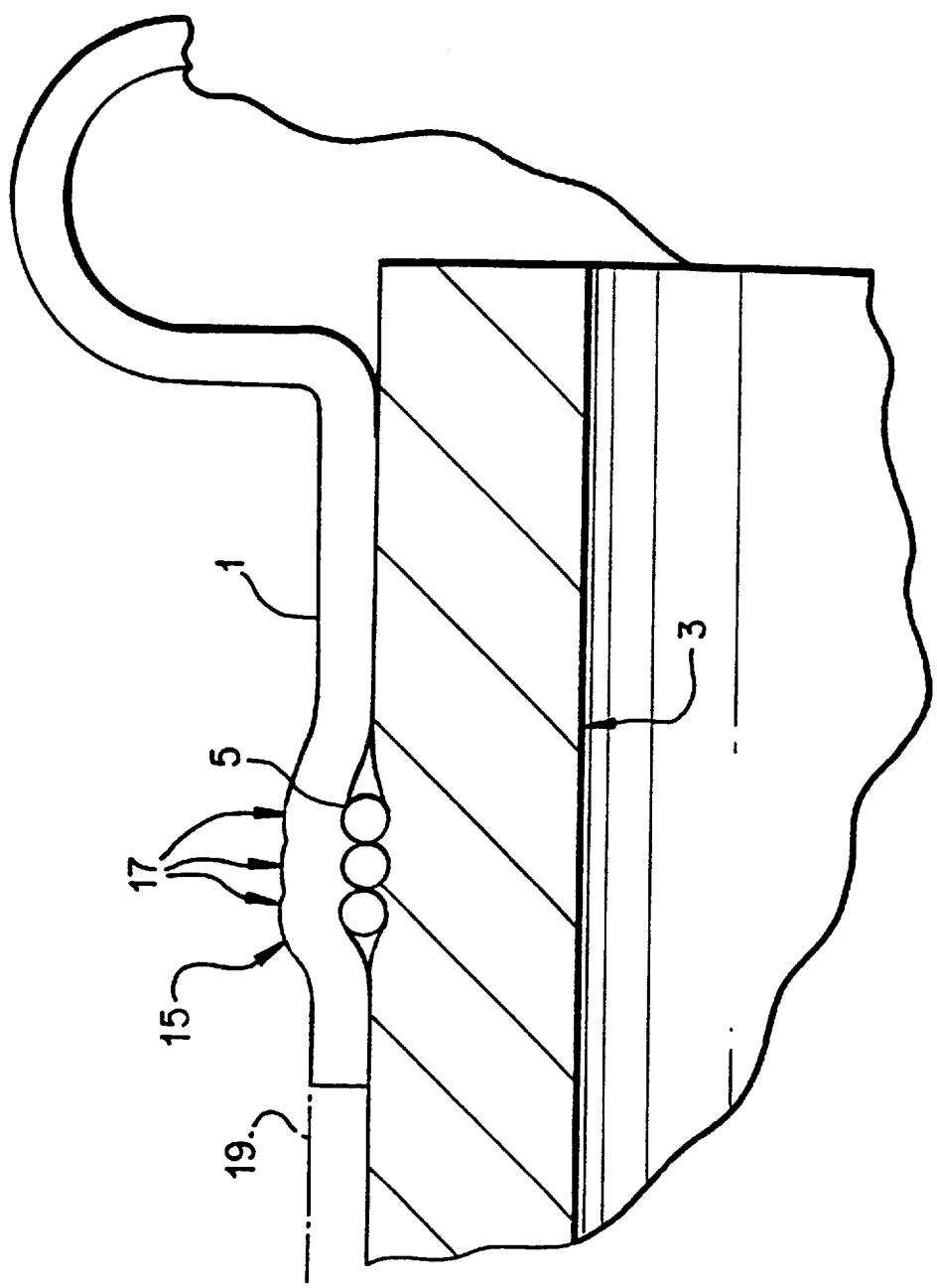
FIG. 3 depicts an expanded view of section "A" in FIG. 2 (Scale 8:1).

Encircled Section A in FIG. 2 is expanded to show "View A" in FIG. 3. As shown in FIG. 3, the section of convoluted conduit 1 is, in a preferred embodiment, compressed onto both the end conduit 3 and the fill material 5. Preferably the fill material 5 is less deformable than the material of the section of convoluted conduit 1. In this manner, at least one ridge 15 is formed. Minor ridges, such as the three minor ridges 17 in FIG. 3, may also be formed. These ridges 15 and 17 may be termed "raised ridges" because they extend above the plane 19 formed by the outer surface of the section of convoluted conduit 1.

Magneforming has been found to be particularly suited to cold forming materials as described in this application. Magneforming is a production method of forming parts and assemblies utilizing energy generated in a pulse magnetic field. In a general sense, controlled magnetic pressure is applied to the work piece without physical contact, thereby eliminating undesirable application of heat, tool marks, contamination, etc. incurred in traditional forming or bending processes. In one embodiment, a magneform 7,000 model machine (Maxwell Laboratories, Inc., San Diego, Calif., U.S.A.) may be used for the cold forming processes described herein.

The basic magnetic pulse principal of magneforming is believed to be the same as that which activates a simply electric motor. When an electric current generates a pulse magnetic field near a suitable metal surface, a controllable pressure is created which can reshape metals without physical contact.

Figure 4:
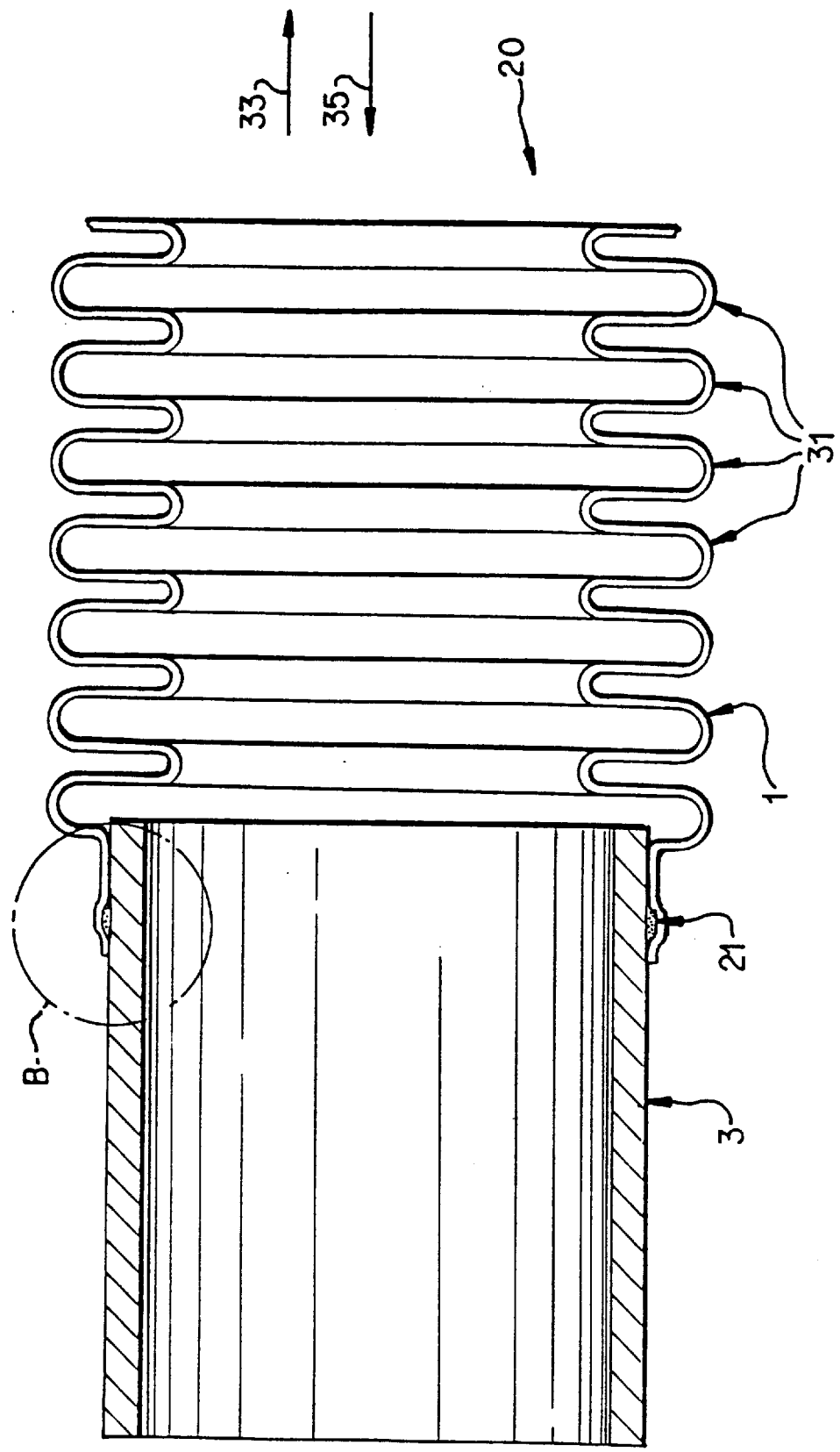
FIG. 4 depicts the assembly of FIG. 2 after heat has been applied to it (Scale 2:1).
Figure 5:
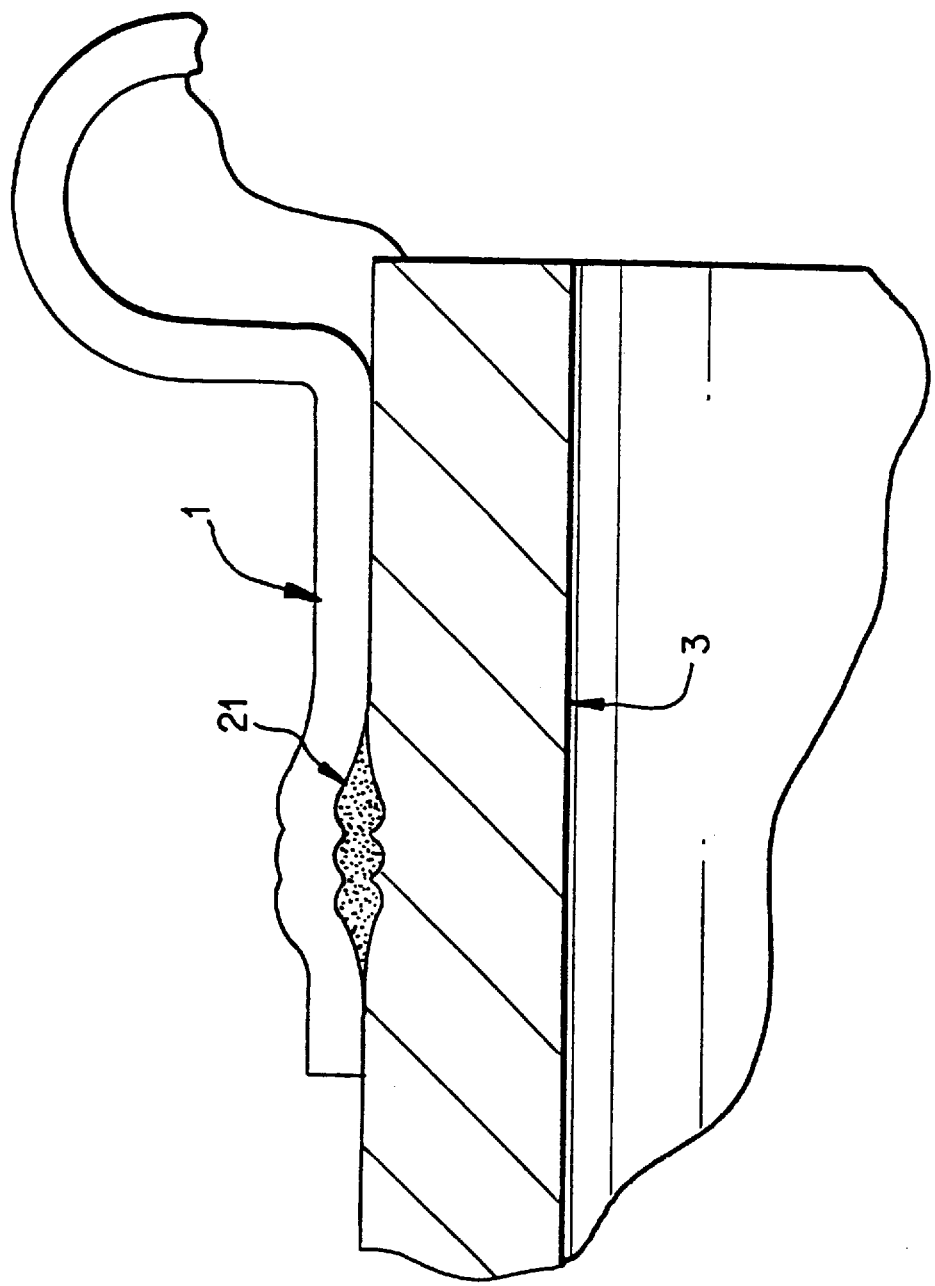
FIG. 5 depicts an expanded view of section "B" in FIG. 4 (Scale 8:1).

A substantially airtight seal is preferably formed between the end conduit 3 and the section of convoluted conduit 1. In a preferred embodiment, the fill material 5 may be heated to form this substantially airtight seal. As shown in FIGS. 4 and 5, after heating, the fill material 5 may melt or soften to form a seal 21 between the end conduit 3 and the section of convoluted conduit 1.

The fill material 5 thus serves at least two purposes. First, the fill material 5 may facilitate formation of a substantially airtight seal between the section of convoluted conduit 1 and the end conduit 3 (e.g., by melting). Second, the fill material 5 may facilitate formation of a ridge. Fill material 5 may preferably comprise solder ring (e.g., pre-formed braze material such as "Sil-Fos" or "Easy Flow 25" by Lucas Millhaupt, Inc., Cudahy, Wis., U.S.A.), solder paste, glue or other adhesives such as hot melt adhesives and epoxy, or solder wire.

In another embodiment, one or more relatively hard rings or bands made of graphite, steel, stainless steel, or other materials may be used as the fill material. In this embodiment, when cold forming processes such as shown in FIG. 3 are applied, then the materials surrounding the fill material may form raised ridges, and a groove in which one or more rings may lie. As such, the rings may act as a ring gasket to provide a substantially airtight seal.

FIG. 5 is an expanded view of encircled section B in FIG. 4. Preferably the heating applied to form the substantially airtight seal 21 is at temperatures low enough to prevent the section of convoluted conduit 1 or the end conduit 3 from annealing. It is believed that annealing significantly weakens the tensile strength of the materials being annealed. As such, if such heating can be performed at relatively low temperatures, annealing can be prevented and thus tensile strengths of the materials heated can be maintained. In a preferred embodiment the heat is applied by induction brazing, which is preferable because heat may be controlled and localized, thereby inhibiting unwanted conductive heat transfer and associated annealing. In other embodiments heat may be applied by a flame or via an oven.

The steps outlined above and in FIGS. 1–5 result in a conduit 20 comprising an end with an outer surface. This conduit 20 may also be formed in different embodiments and using different methods. The word "convoluted" in this context means grooved, helical, spiral, or annular/corrugated conduit. The word "conduit" is defined to include a pipe, duct, fitting, joint, etc., and a conduit may have rectangular, circular, square, oval, or irregular cross-sections. The conduit 20 may be formed without cold forming methods. For instance, the convoluted conduit 1 may be brazed or welded to end conduit 1. Furthermore, the fill material 5 need not be solder or solder rings, but instead can include solder paste or glue.

Figure 6:
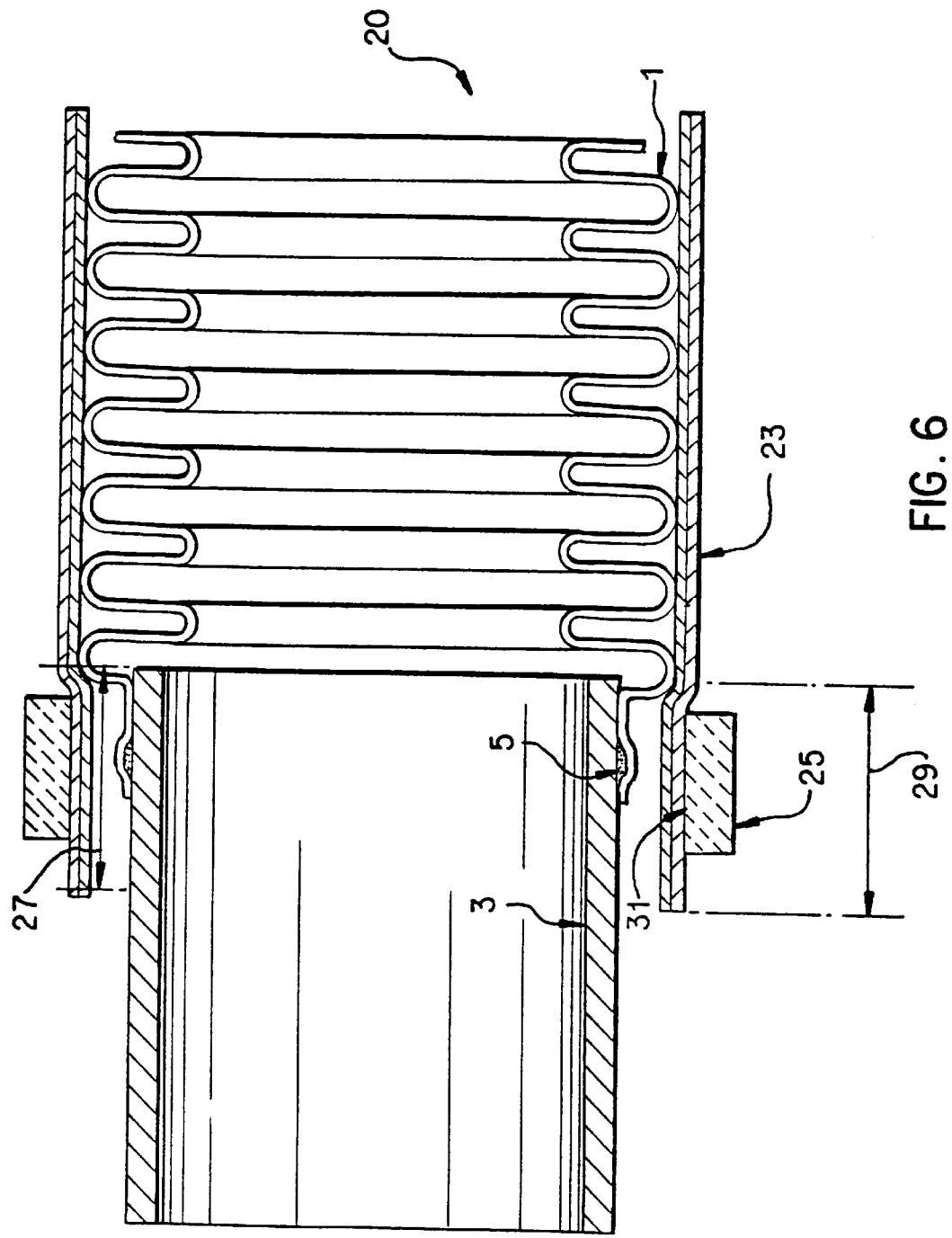
FIG. 6 depicts a convoluted conduit assembled together with a braid and a grip ring (Scale 2:1).

Once a conduit 20 is prepared, it may then be assembled with a braid 23 and a grip ring 25 such that an outer surface 27 of the conduit 20 is substantially surrounded by a portion 29 of the braid 23. In turn, at least part 31 of the portion 29 of the braid 23 is substantially surrounded by a portion of the grip ring 25. See FIG. 6.

A grip ring is defined to be a section of material that is bendable or moldable by cold forming processes, and that is shaped to substantially surround at least a portion of the braid 23. The grip ring may be longer or shorter, and/or thinner or fatter, than grip ring 25 shown in the Figures. For instance, it may be the shape of the additional material 61 shown in FIGS. 8–9. The grip ring 25 may made of metals, polymers, plastics, fibrous materials, or composite materials.

A braid is defined to be a network of elongated materials intertwined or interwoven with each other. For instance, a braid may comprise a network of fibers or wires woven in a criss-cross or cross-hatch pattern.

Figure 7:
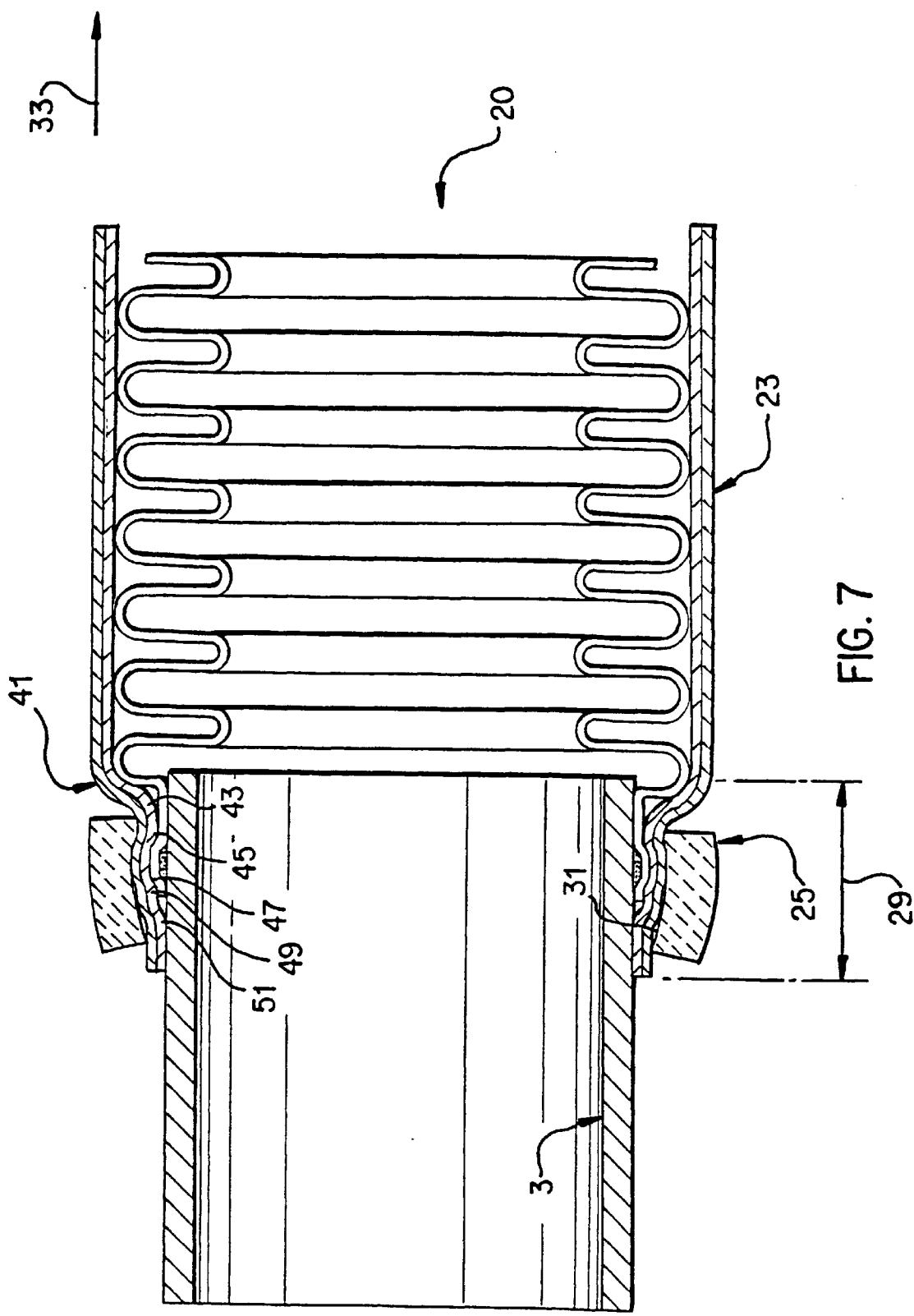
FIG. 7 depicts the assembly of FIG. 6 after it has been cold formed (Scale 2:1).

As shown in FIG. 7, in a preferred embodiment the assembled braid 23, end 3, and grip ring 25 is cold formed such that at least a portion of the grip ring 25 is compressed onto at least part 31 of the portion 29 of the braid 23. In this manner, at least part 31 of the portion 29 of the braid 23 is held by friction between the outer surface of the end 3 and at least a portion of the grip ring 25.

In a preferred embodiment the grip ring 25 may be cold formed such that it holds the braid 23 by friction between a portion of the grip ring 25 and a part of the section of conduit 1. This part is preferably a convolution proximate the end conduit 3.

As shown in FIG. 7, cold forming tends to thicken and compress the grip ring 25 onto the braid 23. In this manner, the braid 23 is squeezed between the grip ring 25 and the conduit 20. Again, preferably the cold forming is by magneforming because of the advantages provided by magneforming which are described above. In addition, in a preferred embodiment the grip ring 25 is sized such that its diameter after cold forming is at least ⅔ of its diameter prior to cold forming. In this manner wrinkling of the grip ring 25 or of the other materials may be inhibited.

Cold forming methods provide a significant advantage when preparing conduits covered with braids. Such conduits with braids, the braids themselves, and or the grip rings may be typically made of metals such as copper, bronze, steel, stainless steel, etc.

Braids are typically used to provide additional pressure strength to the convoluted conduits. As the convoluted conduit is pressurized, the convolutions, which provide flexibility to the conduit, become a disadvantage in that they tend to longitudinally expand under pressure. For instance, if the assembly in FIG. 4 was pressurized beyond a relatively low pressure, then the convolution 31 would begin to expand in directions 33 and 35. To prevent such expansion, braids 23 may be used to cover the convolutions 31. Thus braid 23 contributes to the longitudinal stability (and pressure stability) of the conduit by inhibiting longitudinal expansion of convolutions 31. The ability of braid 23 to prevent the expansion of convolutions 31 under pressure is dependent upon the strength of the braid 23 itself and the strength of the coupling force between the braid 23 and the end conduit 3.

In the past, braids 23 have been coupled to conduits 3 by brazing or welding these braids 23 to the end conduit 3. In the brazing or welding process, however, the braid material, which is typically made of a multitude of individual wires or fibers, has become annealed, thereby significantly weakening the strength of the braid materials. The end conduit 3 may also become annealed. Since the braid materials are usually significantly thinner than the end conduit materials, the braid materials have in the past usually failed first. As a result of braid material failure caused by annealing of the braid, practitioners have used braids that were heavier and thicker (and more expensive) for the entire braid since the weak point (the braze point) had to be maintain a minimum level of tensile strength after brazing.

Practitioners have also attempted to clamp braid 23 to end conduit 3. These attempts, however, have been largely unsuccessful since the clamping force has usually not been strong enough to bind the braid 23 to the conduit 3 when the braid is subjected to longitudinal pressure exerted by the convolutions 31 under pressure. In the embodiments described in this application, however, braid 23 has been found to adequately couple to the conduit 3 under pressure.

It is believed that one factor contributing to adequate coupling of the braid 23 to the end conduit 3 includes the bending of the braid under the cold forming processes. As shown in FIG. 7, braid 23 includes bends 41, 43, 45, 47, 49, and 51. Each bend in the braid provides additional resistance to the braid "pulling out" in direction 33 from under the grip ring 25. Just as a mountain climber can support a heavier companion with her weight by wrapping the connecting rope around a tree, the braid 23 can withstand additional pulling force in direction 33 because of the multiple bends 41, 43, 45, 47, 49, and 51 (this pulling force usually occurs when the convolutions are pressurized and they then attempt to expand). In this regard, raised ridges 15 and 17 all contribute to adding additional bends to the braid 23, thereby increasing the frictional hold of the grip ring 25 on the braid 23. In a preferred embodiment, at least one of the bends is at least at a 30°–45° angle. As the angle of the bend increases, the resistance to braid 23 being pulled in direction 33 also tends to increase.

Another contributing factor to the coupling force between braid 23 and end conduit 3 is the effectiveness of magneforming versus other cold forming processes. By magneforming the assembly, the amount and direction of compressive force on grip ring 25 can be controlled without physically contacting the grip ring 25. As a result, little or no surface contamination, heat deformation, or tool marks result. Furthermore, magneforming allows the grip ring 25 to be uniformly compressed, thereby providing a more uniform frictional hold on the braid 23.

One of the advantages provided by the methods and conduit described herein is that the convolutions are not brazed or otherwise fixably bound when the braid 23 is coupled to the conduit 20. As shown in FIG. 10, one of the disadvantages of providing a braze joint was that the convolution 121 which was proximate the braze joint tended to become fixably bound and annealed during the brazing process. As a result, that convolution 121 could not fully flex when the conduit was bent and the convolution 121 was annealed at a point at which flexing forces were to be applied. In addition, forces applied to the convolution 121 during flex were concentrated in the portions of the convolution 121 that were not fixably bound. The conduits thus tended to fail at or near convolution 121. In the conduits described herein, however, no brazing is necessary to couple the braid 23 to the conduit 20. As a result, the convolution proximate the end conduit 3 (see FIG. 9) is not annealed and the forces applied to this convolution may be distributed substantially evenly throughout that convolution, instead of being concentrated in the portions of the convolution that is not fixably bound.

In a preferred embodiment, the outer diameter of the conduit 20 includes at least one section which is greater than the outer diameter of the end conduit 3. In this manner, the braid may be bent so that it lies both against the outer diameter of the conduit and the outer diameter of the end. See FIG. 7 and bends 41 and 43. Furthermore, the braid 23 may be bent so that it substantially conforms to the shape of the interface region between the conduit and the end 3.

Figure 8:
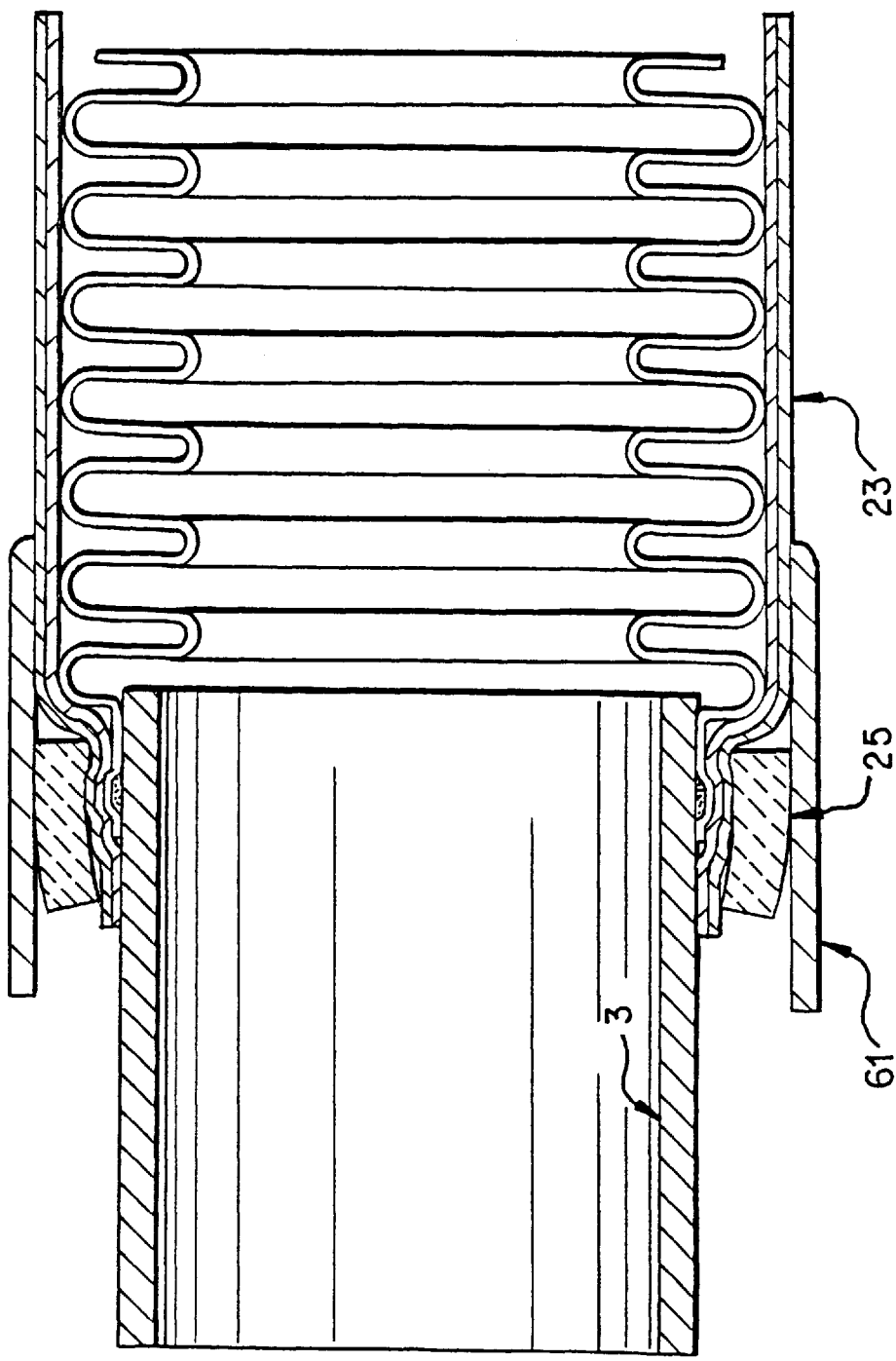
FIG. 8 depicts additional material such as a ferrule assembled together with the cold formed assembly of FIG. 7 (Scale 2:1).

In a preferred embodiment, further additional material, such as a ferrule or additional grip ring, may be applied to at least one portion of the grip ring 25 or the braid 23. As shown in FIG. 8, this additional material 61 may be placed adjacent to the grip ring 25 and/or the braid 23. The additional material used in any application may be longer or shorter, and/or thinner or thicker, than the additional material 61 shown in FIG. 8. Furthermore, the additional material used in any application may not necessarily cover the grip ring 25, the braid 23, and/or the end 3.

Figure 9:
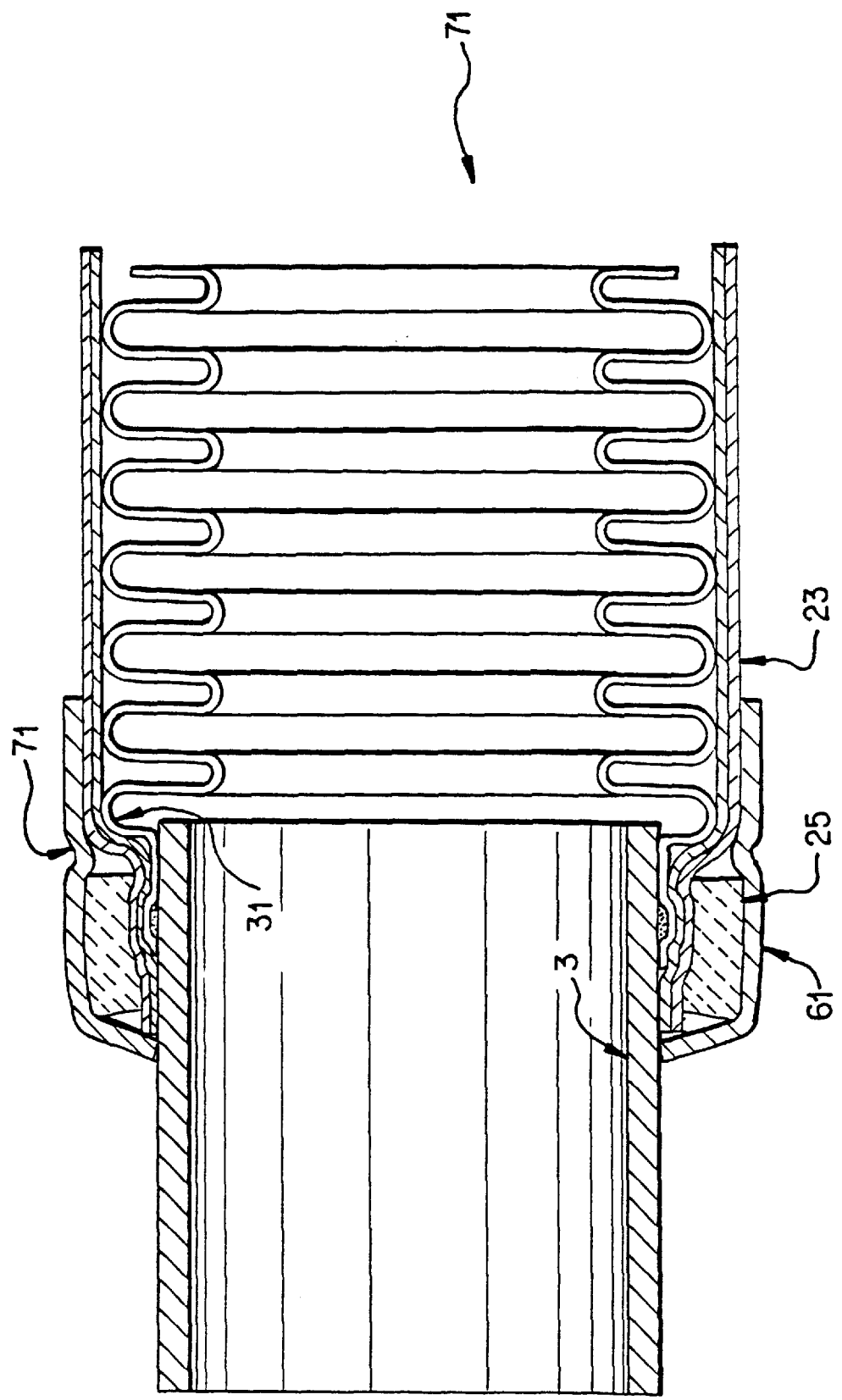
FIG. 9 depicts the additional material of FIG. 8 after it has been cold formed onto the cold formed assembly of FIG. 7 (Scale 2:1).
Figure 10:
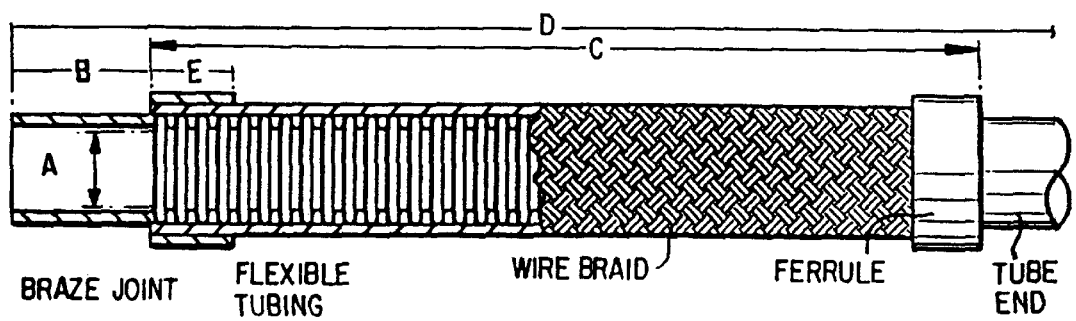
FIG. 10 depicts a section of flexible conduit covered with braid, the flexible conduit being connected to the braid, ferrule, etc. by known methods (brazing) (A=inside diameter, B=tube end length, C=flexible tubing length, D=overall length, and E=ferrule length).

As shown in FIG. 9, the additional material 61 may be cold formed in a preferred embodiment onto the end 3, the grip ring 25, and/or the braid 23. The additional material 61 provides a smooth and aesthetically pleasing appearance to the outer surface of the assembly 71 (a smooth outer surface is desirable to prevent scraps and scratches when the assembly is handled). In addition, the additional material 61 provides a supplemental compressive force against the end conduit 3, braid 23, and grip ring 25. This supplemental compressive force provides supplemental holding force against the braid 23. Specifically, section 71 of the additional material 61 provides a supplemental compressive force against the braid 23 located against convolution 31 of the conduit 20.

As shown in FIG. 9, in a preferred embodiment the additional material 61 is locked onto the grip ring 25 and the braid 23. The additional material 61 preferably applies compressive force directly against the braid 23 at points 115 and 117, which are located on either side of the grip ring 25. The additional material 61 preferably includes bend 111 which serves to inhibit slippage of the additional material 61 in direction 35. Furthermore, the additional material 61 preferably includes bend 113 which serves to inhibit slippage of the additional material in direction 33. Additional material is thus locked in place via the combination of the bends 111 and 113, and the compressive force applied during the cold forming process.

Figure 12:
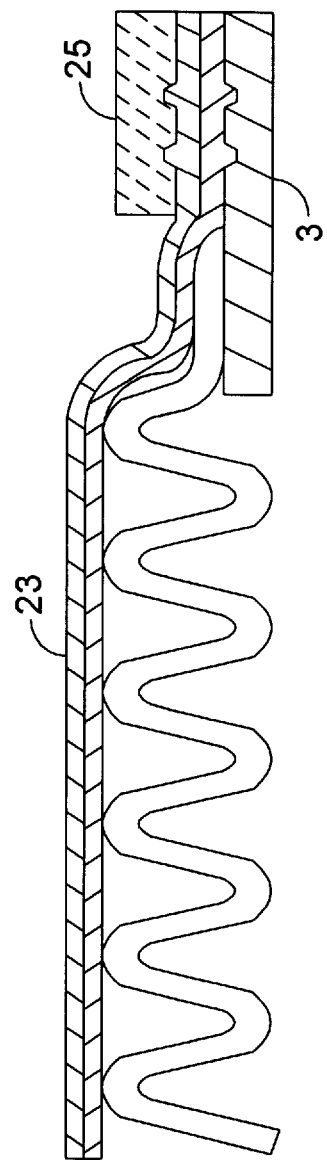
FIG. 12 depicts an embodiment in which a braid is embedded within a grip ring and a conduit.

In a preferred embodiment the cold forming processes apply sufficient force to emboss or embed the braid material into the additional material 61, the end conduit 3, the grip ring 25, and/or the convolution 31. For instance, in the embodiments shown in the FIGS. 1–9, if the parts are disassembled it is possible to view a braid pattern embedded into the additional material 61, the end conduit 3, the grip ring 25, and/or the convolution 31. This embedding or embossing of the braid further prevents the braid from disengaging from or slipping away from the additional material 61, the end conduit 3, the grip ring 25, and/or the convolution 31. In an embodiment of the invention, the braid is embedded into the conduit and the grip ring in the manner illustrated in FIG. 12.

Figure 11:
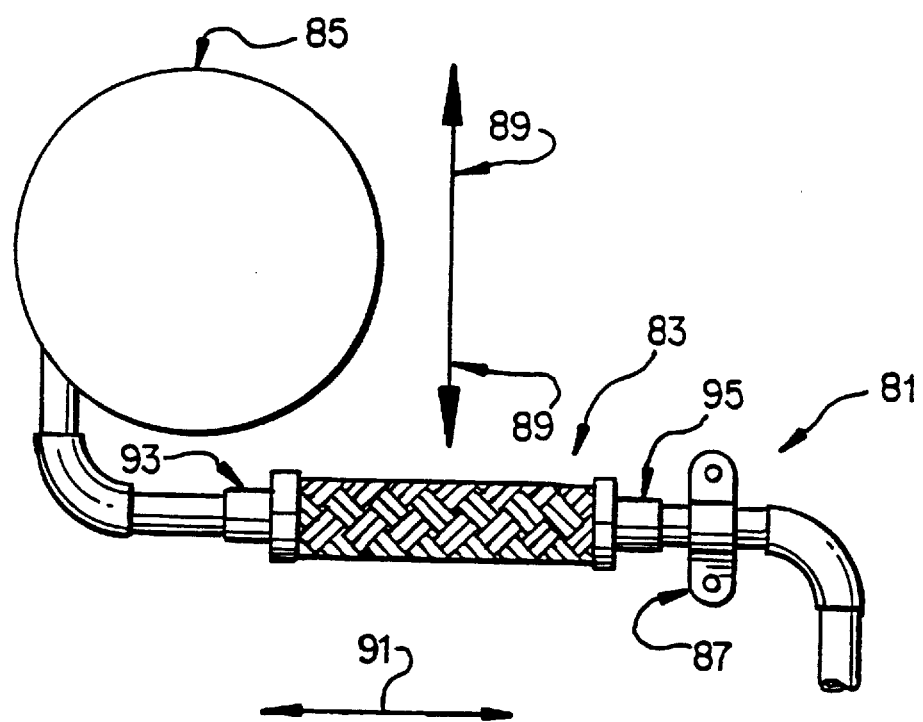
FIG. 11 depicts a section of flexible conduit in a vibration absorption system.

FIG. 11 depicts a vibration absorbing system 81 including a flexible conduit 83 covered with a braid. The system 81 may be connected into either the inlet or outlet lines to a pump or compressor 85. The system 81 may be connected such that vibrations from the pump or compressor 85 are maximized in a first direction 89, and wherein the conduit 83 is longitudinally connected in a second direction 91 which is substantially perpendicular to the first direction.

Preferably the conduit 83 has a first end 93 and a second end 95, the first end 93 being closest to the pump or compressor 85 and the second end 95 being distant from the pump or compressor. In a preferred embodiment second end 95 is anchored with anchoring system 87 to prevent movement.

In a preferred embodiment the conduits described herein may be incorporated into vibration absorbers connected to other equipment such as pumps or compressors. The conduits described herein may be used to make pump connectors or compressor connectors.

Given that relatively high pressure (e.g. at least about 2000 or 2500 p.s.i.g.) braided conduits may now be prepared with cold forming processes, it is expected that new, better, and/or less expensive materials may be used for the conduits, the end conduit, the braids, etc. For instance, it is expected that the conduit, end conduit, braids etc, may comprise materials such as graphite fibers, cloth, plastic, fiberglass, and other materials that previously could not be used because of the high temperatures involved in making braze joints.

Another advantage with the conduits prepared with cold forming processes is that the cold forming can be much less labor intensive and cleaner. For instance, magneforming can be performed by equipment and, unlike "hot" techniques such as welding or brazing, it does not leave spurs and marks that have to been cleaned.

In the applications described above, the section of convoluted conduit 1 is applied onto the end conduit 3. It is to be understood that the placement of these materials, as with the placement of the other materials such as the braid 23, the grip ring 25, and the additional material 61, may be reversed, interchanged, switched, or differed in various applications. In certain applications different order of materials may be desirable to check for leaks, reduce flow restrictions in the resulting conduit, aesthetics, etc.

EXPERIMENTAL RESULTS

Experiment #1—Known Conduits

For comparative purposes, flexible convoluted conduit units were made which corresponded to the conduit shown in FIG. 10. These units correspond to model number VAF-8 made by Packless Industries (Waco, Tex, U.S.A.). Each unit was made with ¾ inch (about 19 mm) inside diameter red brass conduit hose with corrugated convolutions. Each convolution had a maximum outside diameter of 1.2 inch (about 30 mm), and a minimum outside diameter of 0.786 inch (about 20 mm). The convoluted conduit hose was approximately 9 inches (about 229 mm) in length (dimension "C" in FIG. 10), and included 7 convolutions per inch (about 25 mm). Each conduit hose included two copper end conduits which were 1.25 inches (about 32 mm) in length (dimension "B" in FIG. 10), and each end of each conduit was covered with a ⅝ inch (about 16 mm) length copper ferrule (dimension "E" in FIG. 10). Bronze braid type "48-5" (e.g., 48 strands of wire with five wires per strand) were used. Braze material made of about 65 percent copper and 35 percent zinc (also known as "muntz metal") was used to braze the braid to the end of the conduit.

When hydraulically pressure tested, three conduit units of FIG. 10 failed at 2600, 2400, and 2600 p.s.i.g. (about 179, 165, and 179 bar), respectively. These units met the United Laboratories, Inc. ("UL") standard of being able to withstand 2200 p.s.i.g. (about 152 bar) for one minute. The tests were conducted by pressurizing to 2100 p.s.i.g. (about 145 bar) for one minute, then gradually increasing the pressure to 2300 p.s.i.g. (about 159 bar) and holding for one minute, and then gradually increasing the pressure to failure (for the conduit that failed at 2400 p.s.i.g. (about 165 bar)) or 2500 p.s.i.g. (about 172 bar) and holding for one minute, and then gradually increasing the pressure until failure. Each of the failures was due to the braid breaking at or near the point that it was brazed to the end of the conduit.

Experiment #2—New Flexible Conduits

Two conduit units were made in a manner as shown and described in FIGS. 1–9. Cold forming was performed by magneforming. The conduit materials were identical to the brazed conduit materials described in Experiment #1, except that a copper grip ring of 1.29 inch (about 33 mm) initial inside diameter and 0.312 inch (about 8 mm) length was used as described in connection with FIGS. 6–9. These two conduit units did not fail until 2750 (about 190 bar) and 2850 p.s.i.g. (about 197 bar). Significantly, the failure was due to the end conduit fitting breaking, not failure of the braids at or near the connection point to the end conduit.

Experiment #3—Flexible Conduits With Reduced Diameter Braid Wires

Instead of testing new conduit units with higher pressure fittings, additional tests were directed at determining if reduced braid wire sizes could be used with the methods described herein to prepare a more cost efficient, lighter, and stronger flexible conduit. In these tests, 12 conduits were made according to the method described for Experiment #2 except that braid wires were reduced to 0.010 inch (about 0.25 mm) diameter 304 stainless steel instead of the 0.021 inch (about 0.53 mm) diameter bronze material used in Experiment #2. Tests were conducted by pressurizing to 2100 p.s.i.g. (about 145 bar) for one minute and then increasing the pressure to 2500 p.s.i.g. (about 172 bar) for one minute. The pressure was then increased until failure. The average failure, as shown below, was about 2700 p.s.i.g. (about 186 bar).

| Unit #1 | Failure Point 2600 p.s.i.g. (about 179 bar) |
| #2 | Failure Point 2800 p.s.i.g. (about 193 bar) |
| #3 | Failure Point 2650 p.s.i.g. (about 183 bar) |
| #4 | Failure Point 2650 p.s.i.g. (about 183 bar) |
| #5 | Failure Point 2750 p.s.i.g. (about 190 bar) |
| #6 | Failure Point 2700 p.s.i.g. (about 186 bar) |
| #7 | Failure Point 2800 p.s.i.g. (about 193 bar) |
| #8 | Failure Point 2650 p.s.i.g. (about 183 bar) |
| #9 | Failure Point 2700 p.s.i.g. (about 186 bar) |
| #10 | Failure Point 2650 p.s.i.g. (about 183 bar) |
| #11 | Failure Point 2750 p.s.i.g. (about 190 bar) |
| #12 | Failure Point 2700 p.s.i.g. (about 186 bar) |

In Unit #1 the test fitting failed at 2600 p.s.i.g. (about 179 bar), thereby preventing any test on the braid, etc. connections.

Since the diameter of the stainless steel braid wire in Experiment #3 (0.010 inch (about 0.25 mm)) was less than one-half the diameter of the bronze braid wire of Experiments #1–2 (0.021 inch (about 0.53 mm)), the mass of stainless steel braid wire in Experiment #3 was less than 25% of the mass of the bronze braid wire in Experiments #1–2. If the diameter of wire is halved, then the weight of wire is reduced by 75%, without accounting for differences in density between 304 stainless steel and bronze (304 stainless steel has a density about 5–10% lower than the density of bronze).

The stainless steel wire in Experiment #3 had a tensile strength of 80,000 p.s.i. (about 5516 bar), which is greater than the tensile strength of the bronze wire (47,000 p.s.i. (about 3241 bar)) in Experiments 1–2.

Since the tensile strength of the stainless steel wire was approximately 70% greater than the tensile strength of the bronze wire, it would be expected that about 47,000/80,000 (3241/5516) (about 59%) of the stainless steel mass would be needed to achieve the same results as the bronze wire braid of Experiment #1. In fact, however, the mass of stainless steel braid actually used in Experiment #3 was much less. It was less than 25% of the mass of bronze wire braid used in Experiment #1. As a result, when the conduit made in Experiment #3 is compared on an effective mass per tensile strength basis to the conduit made in Experiment #1, it was found that less than ½ of the mass of equivalent braid wire was required to achieve equal or greater effective tensile strengths (effective tensile strength meaning the tensile strength of the braid when used on the conduits). For instance, even accounting for the increased tensile strength of the stainless steel wires in Experiment #3, the conduits of Experiment #3 still withstood higher average pressures than the conduits of Experiment #1—and the conduits of Experiment #3 did so with less than one-half of the mass of braid wire.

The above experiments show that significant savings in weight and cost may be achieved while at the same time achieving failure pressures in excess of the failure pressures achieved with known conduits. For instance, given that only about 25 percent of braid material was used (as compared to Experiment #1), then this conduit can be prepared with about a 27 percent savings in materials costs, even considering the higher cost of the stainless steel in Experiment #3. Further significant savings in labor can also be achieved, given that the cold forming processes, which can be automated, can be significantly less labor intensive than "hot" forming processes such as welding or brazing. For instance, when brazing is used, it is usually substantially "by hand" and further significant additional labor must be employed for cleaning of excess "muntz metal" after the brazing process is complete. It is estimated that labor costs for preparing conduit such as described in Experiment #3 can be reduced by about 40–60 percent over conduit brazed together as described in Experiment #1.

Experiment #4–Flexible Conduits With Reduced Dia. Braid Wires—No Additional Material 61 (I.E., No Ferrule)

Three convoluted conduits were made as described in Experiment #3 except that these conduits did not include the additional material 61 shown in FIGS. 8–9 and described in the accompanying text. When tested in the manner described in Experiment #3, these conduits failed between 2250 and 2400 p.s.i.g. (about 155 and 166 bar).

Experiment #5—Flexible Conduits With Reduced Dia. Braid Wires—Grip Ring 25 in Shape of Additional Material 61.

Three additional conduits were made as described in Experiment #4 except that the grip ring 25 was modified so that it was the same shape as the additional material 61 shown in FIGS. 8–9. When tested in the manner described in Experiment #3, these conduits did not fail until 2750 p.s.i.g. (about 190 bar). These tests indicate that the additional material 61 shown in FIGS. 8–9 may not be necessary if the shape of the grip ring 25 is modified to be longer and cover a greater proportion of the braid 23 and/or the convolutions (e.g. convolution 31).

Although not specifically illustrated in the drawings, it is understood that other additional and necessary materials, apparatus, and structural components will be provided, and that these and all of the components described above are arranged and supported in an appropriate fashion to form a complete and operative conduit, process, or system.

It is also understood that variations may be made in the present invention without departing from the spirit and scope of the invention. Of course, other variations can be made by those skilled in the art without departing from the invention as defined by the appended claims.

I claim:

1. A conduit covered with a braid, comprising:
   a section of flexible convoluted conduit comprising a plurality of convolutions and an end having an outer surface;
   a braid covering the section of conduit and having a portion cold formed onto an outer surface of the end;
   at least a portion of a grip ring substantially surrounding at least part of the portion of the braid, the portion of grip ring being cold formed onto the braid in a cold formed connection such that the part of the portion of braid is held by friction in a cold formed connection between a portion of grip ring and an outer surface of the end.

2. The conduit of claim 1, wherein the portion of braid being magneformed onto an outer surface of the end, and the portion of grip ring being magneformed onto the braid.

3. The conduit of claim 2 wherein the grip ring is thicker after magneforming than it was before magneforming.

4. The conduit of claim 1 wherein the braid is at least partially embedded into the conduit.

5. The conduit of claim 1 wherein neither the braid nor any portion of the conduit has been annealed.

6. The conduit of claim 1 wherein the conduit and the braid comprise metal, and wherein neither the braid nor any portion of the conduit has been annealed.

7. A conduit covered with a braid, comprising:
   a section of flexible convoluted conduit comprising an end having an outer surface;
   a braid covering the section of conduit and having a portion cold formed onto an outer surface of the end, the braid having a cross section comprising at least two bends;
   at least a portion of a grip ring substantially surrounding at least part of the portion of the braid, the portion of grip ring being cold formed onto the braid such that the part of the portion of braid is held by friction between a portion of grip ring and an outer surface of the end; and
   a section of convoluted conduit against an end conduit with fill material being placed between the section of convoluted conduit and the end conduit;
   and wherein the two bends strengthen the frictional hold on the braid.

8. The conduit of claim 7 wherein the fill material comprises solder and has been heated to temperatures low enough to prevent annealing of the convoluted conduit, thereby forming a substantially airtight seal between the end conduit and the convoluted conduit.

9. The conduit of claim 7 wherein the section of convoluted conduit is cold formed onto at least a portion of the end conduit such that the section of convoluted conduit is held onto a portion of the end conduit by friction with the end conduit, the fill material being held by friction between the section of convoluted conduit and the end conduit.

10. The conduit of claim 9 wherein the section of convoluted conduit is magneformed onto at least a portion of the end conduit.

11. The conduit of claim 9 wherein the convoluted conduit is bent onto the fill material to form a raised ridge.

12. The conduit of claim 9 wherein the fill material is less deformable under pressure than the convoluted conduit.

13. The conduit of claim 7 wherein the fill material is less deformable under pressure than the conduit.

14. The conduit of claim 1, further comprising a ridge rising from a surface of the end of the conduit, and wherein the portion of the braid is bent around the ridge.

15. The conduit of claim 1 wherein a cross section of the braid comprises at least two bends which strengthen the frictional hold on the braid.

16. The conduit of claim 1 wherein the conduit comprises an outer diameter greater than an outer diameter of the end, and wherein the braid lies against both the outer diameter of the conduit and the outer diameter of the end.

17. The conduit of claim 1 wherein the braid is bent so that it substantially conforms to the shape of an interface region between the conduit and the end.

18. The conduit of claim 1, further comprising additional material cold formed onto at least a portion of the grip ring.

19. The conduit of claim 18 wherein the additional material holds the grip ring by friction against the braid during use.

20. The conduit of claim 1, further comprising additional material cold formed onto at least a portion of the grip ring and at least a portion of the braid.

21. The conduit of claim 20 wherein the additional material holds the braid by friction between the additional material and the conduit during use.

22. A convoluted conduit covered with a braid comprising:
   a section of convoluted conduit cold formed onto an end conduit with fill material placed between the section of convoluted conduit and the end conduit, the section of convoluted conduit being held by friction against the end conduit with the fill material being placed therebetween, the convoluted conduit bending onto the fill material to form a raised ridge;

braid covering at least a portion of the section of convoluted conduit;

a grip ring cold formed onto the braid such that at least a portion of the end conduit is covered by a portion of the braid, and wherein at least part of the portion of the braid is covered by at least a portion of the grip ring, the portion of the braid being held by friction between a portion of the conduit and a portion of the grip ring.

23. The convoluted conduit of claim 22 wherein the convoluted conduit is magneformed onto an end conduit, and wherein the grip ring is magneformed onto the braid.

24. The convoluted conduit of claim 22 wherein the fill material comprises solder, and further comprising a substantially airtight seal between the end conduit and the section of convoluted conduit, the airtight seal having been formed by heating the fill material at temperatures low enough to prevent the convoluted conduit from being annealed.

25. The convoluted conduit of claim 22, wherein neither the braid nor any portion of the conduit has been annealed.

26. The convoluted conduit of claim 22 wherein the convoluted conduit and the braid comprise metal, and wherein neither the braid nor any portion of the convoluted conduit has been annealed.

27. A vibration absorber comprising the conduit of claim 1.

28. A vibration absorber comprising the convoluted conduit of claim 22.

29. The conduit of claim 1 wherein the braid is at least partially embedded into the grip ring.

30. The conduit of claim 1 wherein the portion of the grip ring substantially surrounding at least part of the portion of the braid is substantially uniformly compressed onto the part of the portion of the braid.

31. The conduit of claim 18 wherein at least a portion of the grip ring is between the additional material and at least a portion of the flexible convoluted conduit.

32. A conduit covered with a braid, comprising:

an end conduit comprising an outer surface;

a section of flexible convoluted conduit, at least a portion of the flexible convoluted conduit being cold formed onto the outer surface of the end conduit such that the portion of the flexible convoluted conduit is compressed against a portion of the outer surface of the end conduit;

a braid at least partially surrounding the section of flexible convoluted conduit and having a portion cold formed onto a portion of the outer surface of the end conduit; and at least a portion of a grip ring substantially surrounding at least part of the portion of the braid, the portion of grip ring being cold formed onto the braid in a cold formed connection such that the part of the portion of braid is held by friction in a cold formed connection between a portion of grip ring and a portion of the outer surface of the end conduit.

33. The conduit of claim 32, wherein the portion of grip ring is magneformed onto the braid.

34. The conduit of claim 32 wherein the portion of the grip ring is cold formed onto the braid such that the portion of the braid and the portion of the flexible convoluted conduit are each held by friction between the portion of the grip ring and at least a portion of the outer surface of the end conduit.

35. The conduit of claim 32 wherein the flexible convoluted conduit further comprises a plurality of convolutions, each of the convolutions being substantially undeformed by cold forming.

36. The conduit of claim 1 wherein the flexible convoluted conduit further comprises a plurality of convolutions, each of the convolutions being substantially undeformed by magneforming.

37. A conduit covered with a braid, comprising:

a section of flexible convoluted conduit comprising an end having an outer surface;

a braid covering the section of conduit and having a portion cold formed onto an outer surface of the end;

at least a portion of a grip ring substantially surrounding at least part of the portion of the braid, the portion of grip ring being cold formed onto the braid such that the part of the portion of braid is held by friction between a portion of grip ring and an outer surface of the end;

a section of convoluted conduit cold formed onto at least a portion of an end conduit such that the section of convoluted conduit is held onto the portion of the end conduit by friction with the end conduit; and fill material disposed between the section of convoluted conduit and the end conduit, the fill material being held by friction between the section of convoluted conduit and the end conduit, and wherein the convoluted conduit is bent onto the fill material to form a raised ridge.

38. A conduit covered with a braid, comprising:

a section of flexible convoluted conduit comprising an end having an outer surface;

a braid covering the section of conduit and having a portion cold formed onto an outer surface of the end;

at least a portion of a grip ring substantially surrounding at least part of the portion of the braid, the portion of grip ring being cold formed onto the braid in a cold formed connection such that the part of the portion of braid is held by friction in a cold formed connection between a portion of grip ring and an outer surface of the end; and a ridge rising from a surface of the end of the conduit, the portion of the braid being bent around the ridge.

39. A conduit covered with a braid, comprising:

a section of flexible convoluted conduit comprising an end having an outer surface;

a braid covering the section of conduit and having a portion magneformed onto an outer surface of the end;

at least a portion of a grip ring substantially surrounding at least part of the portion of the braid, the portion of grip ring being magneformed onto the braid to form a cold formed connection such that the part of the portion of braid is held by friction in a cold formed connection between a portion of grip ring and an outer surface of the end.

40. The conduit of claim 39 wherein the convoluted conduit comprises a convoluted portion, and wherein the entire convoluted portion is substantially undeformed.

41. The conduit of claim 1 wherein the braid is at least partially embedded into the conduit and the grip ring.

42. The conduit of claim 32 wherein a portion of the braid is magneformed onto the outer surface of the end conduit.

43. The conduit of claim 32 wherein the portion of the grip ring is magneformed onto the braid such that the portion of the braid and the portion of the flexible convoluted conduit are each held by friction between the portion of the grip ring and at least a portion of the outer surface of the end conduit.

44. The conduit of claim 32 wherein the convoluted conduit contains a plurality of convolutions, all of the convolutions being unbrazed.

45. The conduit of claim 32 further comprising additional material cold formed onto at least a portion of the grip ring.

46. The conduit of claim 32 further comprising additional material cold formed onto at least a portion of the grip ring and at least a portion of the braid.

47. The conduit of claim 32 wherein neither the braid nor any portion of the conduit has been annealed.

48. The conduit of claim 32 wherein the braid lies against both an outer portion of the flexible convoluted conduit and the outer surface of the end conduit.

49. The conduit of claim 32 wherein the braid has a cross section comprising at least two bends that strengthen the frictional hold on the braid.

50. The conduit of claim 32 wherein the portion of the grip ring is magneformed onto the braid such that the portion of the braid and the portion of the flexible convoluted conduit are each held by friction between the portion of the grip ring and at least a portion of the outer surface of the end conduit, and wherein the braid has a cross section comprising at least two bends that strengthen the frictional hold on the braid, and wherein the conduit is adapted to hold a fluid at a pressure of at least about 2100 psig.

51. The conduit of claim 32 wherein the portion of the grip ring substantially surrounding at least part of the portion of the braid is substantially uniformly compressed onto the part of the portion of the braid.

52. The conduit of claim 32 wherein the portion of the flexible convoluted conduit is magneformed onto the outer surface of the end conduit.

53. The conduit of claim 32 wherein the braid is at least partially embedded into another portion of the conduit.

54. The conduit of claim 32 further comprising a substantially airtight seal between the flexible convoluted conduit and the end conduit.

55. The conduit of claim 32 wherein the braid is at least partially embedded into the conduit and the grip ring.

56. The conduit of claim 32 wherein the conduit is adapted to bold a fluid at a pressure of at least about 2100 psig.

57. The conduit of claim 32 wherein the conduit is adapted to hold a fluid at a pressure of at least about 2500 psig.

58. The conduit of claim 32 wherein the conduit is adapted to hold a fluid at a pressure of at least about 2700 psig.

59. The conduit of claim 32 wherein the braid is at least partially embedded into the grip ring.

60. The conduit of claim 1 wherein the portion of the grip ring is magneformed onto the braid and a portion of the braid is magneformed onto the outer surface of the end.

61. The conduit of claim 1 wherein the portion of the grip ring is magneformed onto the braid such that the portion of the braid and the portion of the flexible convoluted conduit are each held by friction between the portion of the grip ring and at least a portion of the outer surface of the end.

62. The conduit of claim 1 wherein the convoluted conduit contains a plurality of convolutions, all of the convolutions being unbrazed.

63. The conduit of claim 1 further comprising additional material magneformed onto at least a portion of the grip ring and at least a portion of the braid.

64. The conduit of claim 1 wherein the portion of the grip ring is cold formed onto the braid such that the portion of the braid and the portion of the flexible convoluted conduit are each held by friction between the portion of the grip ring and at least a portion of the outer surface of the end conduit.

65. The conduit of claim 1 wherein the braid is at least partially embedded into another portion of the conduit.

66. The conduit of claim 1 where in the conduit is adapted to hold a fluid at a pressure of at least about 2100 psig.

67. The conduit of claim 1 wherein the conduit is adapted to hold a fluid at a pressure of at least about 2500 psig.

68. The conduit of claim 1 wherein the conduit is adapted to hold a fluid at a pressure of at least about 2700 psig.

69. The conduit of claim 1, further comprising a substantially a airtight seal between the flexible convoluted conduit and the end.

70. The conduit of claim 1 wherein at least a portion of the flexible convoluted conduit is cold formed onto the outer surface of the end conduit such that the portion of the flexible convoluted conduit is compressed against a portion of the outer surface of the end conduit, and wherein the conduit is adapted to hold a fluid at a pressure of at least about 2100 psig.

71. The conduit of claim 38 wherein the portion of the grip ring is magneformed onto the braid and a portion of the braid is magneformed onto the outer surface of the end.

72. The conduit of claim 38 wherein the convoluted conduit contains a plurality of convolutions, all of the convolutions being unbrazed.

73. The conduit of claim 38, further comprising additional material cold formed onto at least a portion of the grip ring.

74. The conduit of claim 38, further comprising additional material cold formed onto at least a portion of the grip ring and at least a portion of the braid.

75. The conduit of claim 38 wherein neither the braid nor any portion of the conduit has been annealed.

76. The conduit of claim 38 wherein the braid has a cross section comprising at least two bends that strengthen the frictional hold on the braid.

77. The conduit of claim 38 wherein the braid lies against both an outer portion of the flexible convoluted conduit and the outer surface of the end.

78. The conduit of claim 38 wherein the braid is at least partially embedded into the grip ring.

79. The conduit of claim 38 wherein the portion of the grip ring is magneformed onto the braid such that the portion of the braid and the portion of the flexible convoluted conduit are each held by friction between the portion of the grip ring and at least a portion of the outer surface of the end conduit, and wherein the braid has a cross section comprising at least two bends that strengthen the frictional hold on the braid, and wherein the conduit is adapted to hold a fluid at a pressure of at least about 2100 psig.

80. The conduit of claim 38 wherein the portion of the grip ring substantially surrounding at least part of the portion of the braid is substantially uniformly compressed onto the part of the portion of the braid.

81. The conduit of claim 38 wherein the conduit is adapted to hold a fluid at a pressure of at least about 2100 psig.

82. The conduit of claim 38 wherein the conduit is adapted to hold a fluid at a pressure of at least about 2500 psig.

83. The conduit of claim 38 wherein the conduit is adapted to hold a fluid at a pressure of at least about 2700 psig.

84. The conduit of claim 38, further comprising a substantially airtight seal between the flexible convoluted conduit and the end.

85. The conduit of claim 38 wherein the convoluted conduit comprises a convoluted portion, and wherein the entire convoluted portion is substantially undeformed.

86. The conduit of claim 38 wherein the portion of the grip ring is magneformed onto the braid such that the portion of the braid and the portion of the flexible convoluted conduit are each held by friction between the portion of the grip ring and at least a portion of the outer surface of the end conduit.

87. The conduit of claim 38 wherein the portion of the grip ring is cold formed onto the braid such that the portion of the braid and the portion of the flexible convoluted conduit are each held by friction between the portion of the grip ring and at least a portion of the outer surface of the end conduit.

88. The conduit of claim 38 wherein the braid is at least partially embedded into the conduit and the grip ring.

89. The conduit of claim 38 wherein the braid is at least partially embedded into another portion of the conduit.

90. The conduit of claim 38 wherein at least a portion of the flexible convoluted conduit is cold formed onto the outer surface of the end conduit such that the portion of the flexible convoluted conduit is compressed against a portion of the outer surface of the end conduit.

91. The conduit of claim 38 wherein at least a portion of the flexible convoluted conduit is magneformed onto the outer surface of the end conduit such that the portion of the flexible convoluted conduit is compressed against a portion of the outer surface of the end conduit, and wherein the portion of the grip ring is magneformed onto the braid such that the portion of the braid and the portion of the flexible convoluted conduit are each held by friction between the portion of the grip ring and at least a portion of the outer surface of the end conduit, and wherein the conduit is adapted to hold a fluid at a pressure of at least about 2100 psig.

92. The conduit of claim 39 wherein at least a portion of the flexible convoluted conduit is magneformed onto the outer surface of the end conduit such that the portion of the flexible convoluted conduit is compressed against a portion of the outer surface of the end conduit, and wherein the braid has a cross section comprising at least two bends that strengthen the frictional hold on the braid, and wherein the portion of the grip ring is magneformed onto the braid such that the portion of the braid and the portion of the flexible convoluted conduit are each held by friction between the portion of the grip ring and at least a portion of the outer surface of the end conduit, and wherein the conduit is adapted to hold a fluid at a pressure of at least about 2100 psig, and wherein the flexible convoluted conduit comprises a convoluted portion, and wherein the entire convoluted portion is substantially undeformed.

93. The conduit of claim 39 further comprising additional material cold formed onto at least a portion of the grip ring.

94. The conduit of claim 39 further comprising additional material cold formed onto at least a portion of the grip ring and at least a portion of the braid.

95. The conduit of claim 39 wherein neither the braid nor any portion of the conduit has been annealed.

96. The conduit of claim 39 wherein the portion of the grip ring is magneformed onto the braid such that the portion of the braid and the portion of the flexible convoluted conduit are each held by friction between the portion of the grip ring and at least a portion of the outer surface of the end conduit.

97. The conduit of claim wherein the braid has a cross section comprising at least two bends that strengthen the frictional hold on the braid.

98. The conduit of claim 39 wherein the braid lies against both an outer portion of the flexible convoluted conduit and the outer surface of the end.

99. The conduit of claim 39 wherein the braid is at least partially embedded into the grip ring.

100. The conduit of claim 39 wherein at least a portion of the flexible convoluted conduit is magneformed onto the outer surface of the end conduit such that the portion of the flexible convoluted conduit is compressed against a portion of the outer surface of the end conduit.

101. The conduit of claim 39 wherein the portion of the grip ring substantially surrounding at least part of the portion of the braid is substantially uniformly compressed onto the part of the portion of the braid.

102. The conduit of claim 39 wherein the portion of the grip ring is magneformed onto the braid such that the portion of the braid and the portion of the flexible convoluted conduit are each held by friction between the portion of the grip ring and at least a portion of the outer surface of the end conduit, and wherein the portion of the grip ring substantially surrounding at least part of the portion of the braid is substantially uniformly compressed onto the part of the portion of the braid.

103. The conduit of claim 39 wherein the conduit is adapted to hold a fluid at a pressure of at least about 2100 psig.

104. The conduit of claim 39 wherein the conduit is adapted to hold a fluid at a pressure of at least about 2500 psig.

105. The conduit of claim 39 wherein the conduit is adapted to hold a fluid at a pressure of at least about 2700 psig.

106. The conduit of claim 39 wherein the braid is at least partially embedded into the conduit and the grip ring.

107. The conduit of claim 39 wherein the braid is at least partially embedded into another portion of the conduit.

108. The conduit of claim 37 wherein the braid has a cross section comprising at least two bends that strengthen the frictional hold on the braid.

109. The conduit of claim 37 wherein the portion of the grip ring substantially surrounding at least part of the portion of the braid is substantially uniformly compressed onto the part of the portion of the braid.

110. The conduit of claim 37 wherein the conduit is adapted to hold a fluid at a pressure of at least about 2100 psig.

111. The conduit of claim 37 wherein the convoluted conduit comprises a convoluted portion, and wherein the entire convoluted portion is substantially undeformed.

112. The conduit of claim 37 wherein the portion of the grip ring is cold formed onto the braid such that the portion of the braid and the portion of the flexible convoluted conduit are each held by friction between the portion of the grip ring and at least a portion of the outer surface of the end conduit.

113. The conduit of claim 37 wherein the braid is at least partially embedded into another portion of the conduit.

114. A conduit covered with a braid, comprising:
an end conduit comprising an outer surface;
a section of flexible convoluted conduit, at least a portion of the flexible convoluted conduit being cold formed onto the outer surface of the end conduit such that the portion of the flexible convoluted conduit is compressed against a portion of the outer surface of the end conduit;
a braid at least partially surrounding the section of flexible convoluted conduit and having a portion cold formed onto a portion of the outer surface of the convoluted conduit; and
at least a portion of a grip ring substantially surrounding at least part of the portion of the braid, the portion of grip ring being cold formed onto the braid such that the part of the portion of braid is held by friction between a portion of grip ring and a portion of the outer surface of the end conduit;
and wherein the cold formed portion of the grip ring, the cold formed portion of the braid, and the cold formed portion of the flexible convoluted conduit are comprised in a cold formed connection between the end conduit and the flexible convoluted conduit, the cold formed connection being adapted to maintain a pressure within the conduit of at least about 2000 psig during use.

115. The conduit of claim 114 wherein the portion of the flexible convoluted conduit is magneformed onto the outer surface of the end conduit.

116. The conduit of claim 114, further comprising a ridge rising from a surface of the flexible convoluted conduit, and wherein the portion of the braid is bent around the ridge.

117. The conduit of claim 114 wherein the braid is at least partially embedded into the grip ring.

118. The conduit of claim 114 wherein the portion of the grip ring substantially surrounding at least part of the portion of the braid is substantially uniformly compressed onto the part of the portion of the braid.

119. The conduit of claim 114 wherein the portion of grip ring is magneformed onto the braid.

120. The conduit of claim 114 wherein the flexible convoluted conduit comprises a convolution proximate an end of the flexible convoluted conduit, and wherein the convolution is substantially undeformed by cold forming.

121. The conduit of claim 114 wherein the portion of the grip ring is magneformed onto the braid such that the portion of the braid and the portion of the flexible convoluted conduit are each held by friction between the portion of the grip ring and at least a portion of the outer surface of the end conduit.

122. The conduit of claim 114, further comprising additional material cold formed onto at least a portion of the grip ring.

123. The conduit of claim 114 wherein neither the braid nor any portion of the conduit has been annealed.

124. The conduit of claim 114 wherein the conduit is adapted to hold a fluid at a pressure of at least about 2100 psig during use.

125. A conduit covered with a braid, comprising:

a section of flexible convoluted conduit comprising an end having an outer surface and a convolution substantially adjacent to the end, the convolution being substantially undeformed by cold forming;

a braid covering the section of conduit and having a portion cold formed onto an outer surface of the end;

at least a portion of a grip ring substantially surrounding at least part of the portion of the braid, the portion of grip ring being cold formed in a cold formed connection onto the braid such that the part of the portion of braid is held by friction in a cold formed connection between a portion of grip ring and an outer surface of the end.

126. The conduit of claim 125 wherein a portion of the flexible convoluted conduit is magneformed onto the outer surface of the end conduit.

127. The conduit of claim 125, further comprising a ridge rising from a surface of the flexible convoluted conduit, and wherein the portion of the braid is bent around the ridge.

128. The conduit of claim 125 wherein the braid is at least partially embedded into the grip ring.

129. The conduit of claim 125 wherein the portion of the grip ring substantially surrounding at least part of the portion of the braid is substantially uniformly compressed onto the part of the portion of the braid.

130. The conduit of claim 125 wherein the portion of grip ring is magneformed onto the braid.

131. The conduit of claim 125 wherein the flexible convoluted conduit further comprises a plurality of convolutions, and wherein each of the convolutions is substantially undeformed by cold forming.

132. The conduit of claim 125, further comprising additional material cold formed onto at least a portion of the grip ring.

133. The conduit of claim 125 wherein neither the braid nor any portion of the conduit has been annealed.

134. The conduit of claim 125 wherein the conduit is adapted to hold a fluid at a pressure of at least about 2100 psig during use.

* * * * *

UNITED STATES PATENT AND TRADEMARK OFFICE
CERTIFICATE OF CORRECTION

PATENT NO. : 5,813,438
DATED : September 29, 1998
INVENTOR(S) : Edward A. Reed

It is certified that error appears in the above-identified patent and that said Letters Patent is hereby corrected as shown below:

Claim 56, column 15, line 41 please delete "bold" and substitute therefor -- hold --.

Signed and Sealed this

Eighteenth Day of May, 1999

Attest:

Q. TODD DICKINSON

Attesting Officer     Acting Commissioner of Patents and Trademarks